United States Patent
Crivat et al.

(10) Patent No.: US 7,636,698 B2
(45) Date of Patent: Dec. 22, 2009

(54) ANALYZING MINING PATTERN EVOLUTIONS BY COMPARING LABELS, ALGORITHMS, OR DATA PATTERNS CHOSEN BY A REASONING COMPONENT

(75) Inventors: Ioan Bogdan Crivat, Redmond, WA (US); Elena D. Cristofor, Redmond, WA (US); C. James MacLennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 11/376,993

(22) Filed: Mar. 16, 2006

(65) Prior Publication Data
US 2007/0219990 A1 Sep. 20, 2007

(51) Int. Cl.
*G06E 1/00* (2006.01)
*G06E 3/00* (2006.01)
*G06G 7/00* (2006.01)

(52) U.S. Cl. ...................................................... 706/21
(58) Field of Classification Search .................... 706/21
See application file for complete search history.

(56) References Cited

U.S. PATENT DOCUMENTS

| | | | |
|---|---|---|---|
| 5,748,852 A | 5/1998 | Mahler | |
| 6,311,173 B1 | 10/2001 | Levin et al. | |
| 6,697,998 B1 | 2/2004 | Damerau et al. | |
| 6,711,585 B1 | 3/2004 | Copperman et al. | |
| 6,931,418 B1 | 8/2005 | Barnes | |
| 6,950,755 B2 | 9/2005 | Stahl | |
| 7,103,222 B2 * | 9/2006 | Peker | 382/181 |
| 2003/0130996 A1 | 7/2003 | Bayerl et al. | |
| 2004/0042665 A1 | 3/2004 | Il et al. | |
| 2004/0215599 A1 * | 10/2004 | Apps et al. | 707/2 |
| 2005/0108254 A1 | 5/2005 | Zhang | |
| 2005/0114360 A1 * | 5/2005 | Russell et al. | 707/100 |
| 2005/0177393 A1 | 8/2005 | Sacco et al. | |
| 2005/0177414 A1 * | 8/2005 | Priogin et al. | 705/10 |

FOREIGN PATENT DOCUMENTS

WO WO2005010727 2/2005

OTHER PUBLICATIONS

Palace, Bill. "What is Data Mining?" 1998, date confirmed by wayback machine.*

(Continued)

*Primary Examiner*—David R Vincent
*Assistant Examiner*—Ben M Rifkin
(74) *Attorney, Agent, or Firm*—Workman Nydegger

(57) ABSTRACT

Architecture for analyzing pattern shifts in data patterns of data mining models and outputting the results. This allows comparing and describing differences between two semantically similar sets of patterns (or mining models), and for analyzing historical changes in versions of the same model or differences in patterns found by two or more different algorithms applied to the same data. The architecture can also facilitate explaining data patterns that shift over time and over different data populations, and between versions of the same model that use different algorithms. A model component is employed for storing data mining models have respective sets of data patterns obtained from a dataset, and an analysis component analyzes the sets of the data patterns for difference data therebetween. The dataset can be a subsample of a larger set of data and can be analyzed by the analysis component over a time period.

17 Claims, 15 Drawing Sheets

OTHER PUBLICATIONS

Eamonn Keogh, Selina Chu, David Hart and Michael Pazzaini. "An Onlinge Algoroithm for Segmenting Time Series" icdm,pp. 289, First IEEE International Conference on Data Mining (ICDM'01), 2001.*

Venkatesh Ganti, Johannes Gehrke, and Raghu Ramakrishnan. "Mining data streams under block evolution" (ACM SIGKDD Exploraitons newsletter. vol. 3, Issue 2. Jan. 2002.*

Xia, et al.; Indexing and Querying Constantly Evolving Data Using Time Series Analysis; 12 pages.

Bounsaytip, et al; Overview of Data Mining for Customer Behaviour Modeling; 2001; 59 pages.

Jian-Cheng, et al.; Towards the Foundation of Data Mining vol. 2:Intelligent Multi-Objective Evolutionary Algorithm for Editing Minimum Reference Set; 2002; 78 pages.

* cited by examiner

US 7,636,698 B2

ANALYZING MINING PATTERN EVOLUTIONS BY COMPARING LABELS, ALGORITHMS, OR DATA PATTERNS CHOSEN BY A REASONING COMPONENT

BACKGROUND

More data is being received, processed, analyzed, and stored than ever before. This is because businesses recognize the importance of this data for use in analyzing consumer spending behaviors, trends, and other information patterns which allow for increased sales, customer profiling, better service, risk analysis, and so on. However, due to the enormity of the information, mechanisms such as data mining have been devised that extract and analyze subsets of data from different perspectives in attempt to summarize the data into useful information.

One function of data mining is the creation of a model. Models can be descriptive, in that they help in understanding underlying processes or behavior, and predictive, for predicting an unforeseen value from other known values. Using a combination of machine learning, statistical analysis, modeling techniques and database technology, data mining finds patterns and subtle relationships in data and infers rules that allow the prediction of future results.

The process of data mining generally consists of the initial exploration, model building or pattern identification and deployment (the application of the model to new data in order to generate predictions). Exploration can start with data preparation which may involve cleaning data, data transformations, selecting subsets of records. Model building and validation can involve considering various models and choosing the best one based on their predictive performance, for example. This can involve an elaborate process of competitive evaluation of the models to find the best performer. Deployment involves applying the selected model to new data in order to generate predictions or estimates of the expected outcome.

When data mining is employed to analyze a dataset, the result is usually a set of patterns that describe the dataset. A set of such patterns can be stored in a mining model. Traditional data mining algorithms can detect such data patterns in datasets. However, datasets are not rigid, and change over time, thereby causing the data patterns to shift with these underlying changes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein is architecture that introduces a new dimension in the pattern analysis for analyzing pattern shifts in data patterns of data mining models, and comparing the data patterns for difference data, and outputting the results. This allows comparing and describing differences between two semantically similar sets of patterns (or mining models). It can be used to analyze historical changes in versions of the same model or differences in patterns found by two or more different algorithms applied to the same data. Besides exposing patterns, the disclosed data mining platform can also facilitate explaining data patterns that shift over time and over different data populations, and between versions of the same model that use different algorithms.

In two versions (e.g., of historically different data or different data subsets) of the same mining model, labels can be assigned to certain cases, and these labels can change. For example, on training set consisting of students, a prediction of whether a student will attend college or not can change. In another example, on a dataset used in clustering, a cluster label assigned to one particular data point can change. The instant architecture provides a solution for describing these label changes.

The invention disclosed and claimed herein, in one aspect thereof, comprises a computer-implemented system for analyzing mining pattern evolution. A model component is employed for storing data mining models having respective sets of data patterns obtained from a dataset. An analysis component analyzes the sets of the data patterns for difference data therebetween. The difference data can be obtained from sets of data patterns from a same dataset, from sets of data patterns of different datasets, and from different versions of same data mining model, the mining models using different algorithms. The dataset can be a subsample of a larger set of data and can be analyzed by the analysis component over a time period.

In another aspect thereof, rules results from applying a classification algorithm that classifies data patterns for labeling can be displayed visually, as a decision tree or a dependency network, or in a tabular format, summarizing the rules that generate changes in the patterns.

In yet another aspect thereof, a machine learning and reasoning (LR) component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
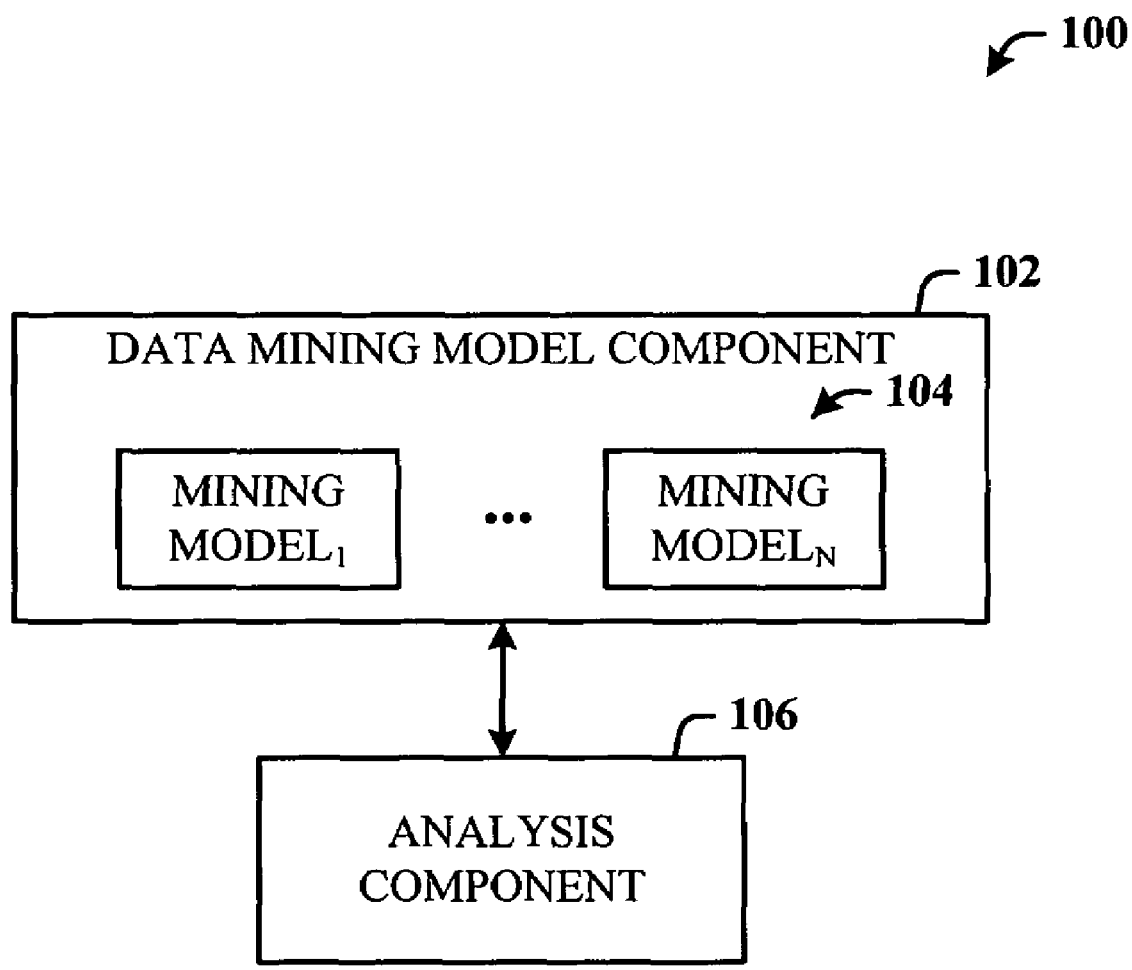
FIG. 1 illustrates a computer-implemented system for analyzing and processing mining pattern evolution in accordance with the innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Traditional data mining algorithms detect patterns in datasets; however, datasets are not rigid, and change over time such that the corresponding data patterns shift with these changes. The invention summarizes the most important features that cause a cluster shift, for example, and provides a clear and useful characterization of the shifts.

The disclosed architecture introduces a new dimension in the pattern analysis for analyzing pattern shifts in data patterns of data mining models, and comparing the data patterns for difference data, and outputting the results. This allows comparing and describing differences between two semantically similar sets of patterns (or mining models). It can be used to analyze historical changes in versions of the same model or differences in patterns found by two or more different algorithms applied to the same data. Besides exposing patterns, the disclosed data mining platform can also facilitate explaining data patterns that shift over time and over different data populations, and between versions of the same model that use different algorithms.

In two versions (e.g., of historically different data or different data subsets) of the same mining model, labels can be assigned to certain cases, and these labels can change. For example, on training set consisting of students, a prediction of whether a student will attend college or not can change. In another example, on a dataset used in clustering, a cluster label assigned to one particular data point can change. The instant architecture provides a solution for describing these label changes.

Referring initially to the drawings, FIG. 1 illustrates a computer-implemented system 100 for analyzing and processing mining pattern evolution in accordance with the innovation. A data mining model component 102 is employed for storing data mining models 104 (denoted MINING $MODEL_1, \ldots, MINING MODEL_N$, where N is an integer) having respective sets of data patterns obtained from a dataset. An analysis component 106 analyzes the sets of the data patterns for difference data therebetween. The difference data can be obtained from sets of data patterns from a same dataset, from sets of data patterns of different datasets, and from different versions of same data mining model, the mining models using different algorithms. The dataset can be a subsample of a larger set of data and can be analyzed by the analysis component over a time period.

In an example scenario, a customer database is analyzed with a clustering algorithm. The result consists in a set of clusters that can be associated with different categories of profitability, based on such customer attributes as total sales to the customer, favorable public relations releases from the customer, support cost for customer, etc. Consider three defined clusters: a "Very profitable" cluster, a "Less profitable cluster" and a "Less profitable, but strategically important, cluster". Further assume that the "Very profitable" cluster description looks like the following:

"[Total Sales]>=25000 AND [Total Sales]<40000 AND [Support Cost]<10000 AND NOT [Location]=WA AND [Join Date]>=10/10/2005

AND [Last TransactionDate]<11/10/2005"

A few months later, changes occur in the customer database. The same analysis is performed and the same clusters are generated. Assume now that the "Less profitable" cluster description looks like the following:

"[Total Sales]<30000 OR ([Total Sales]>=30000 AND [Total Sales]<=40000
AND [Support Cost]>10000)

AND [Join Date]>=10/10/2005

AND [Last TransactionDate]<11/10/2005"

Both cluster descriptions are complex because they take into consideration multiple attributes of the customers. By applying the architecture described herein, what makes a customer shift from one cluster to another over time (e.g., from the "Very profitable" to the "Less profitable" group) can be detected and output. The rules detected can have the form:

IF "Total Sales>=20000" AND "Total Sales<35000"
"[Support Cost]>5000" THEN "Moves from
Very profitable to Less profitable".

Figure 2:
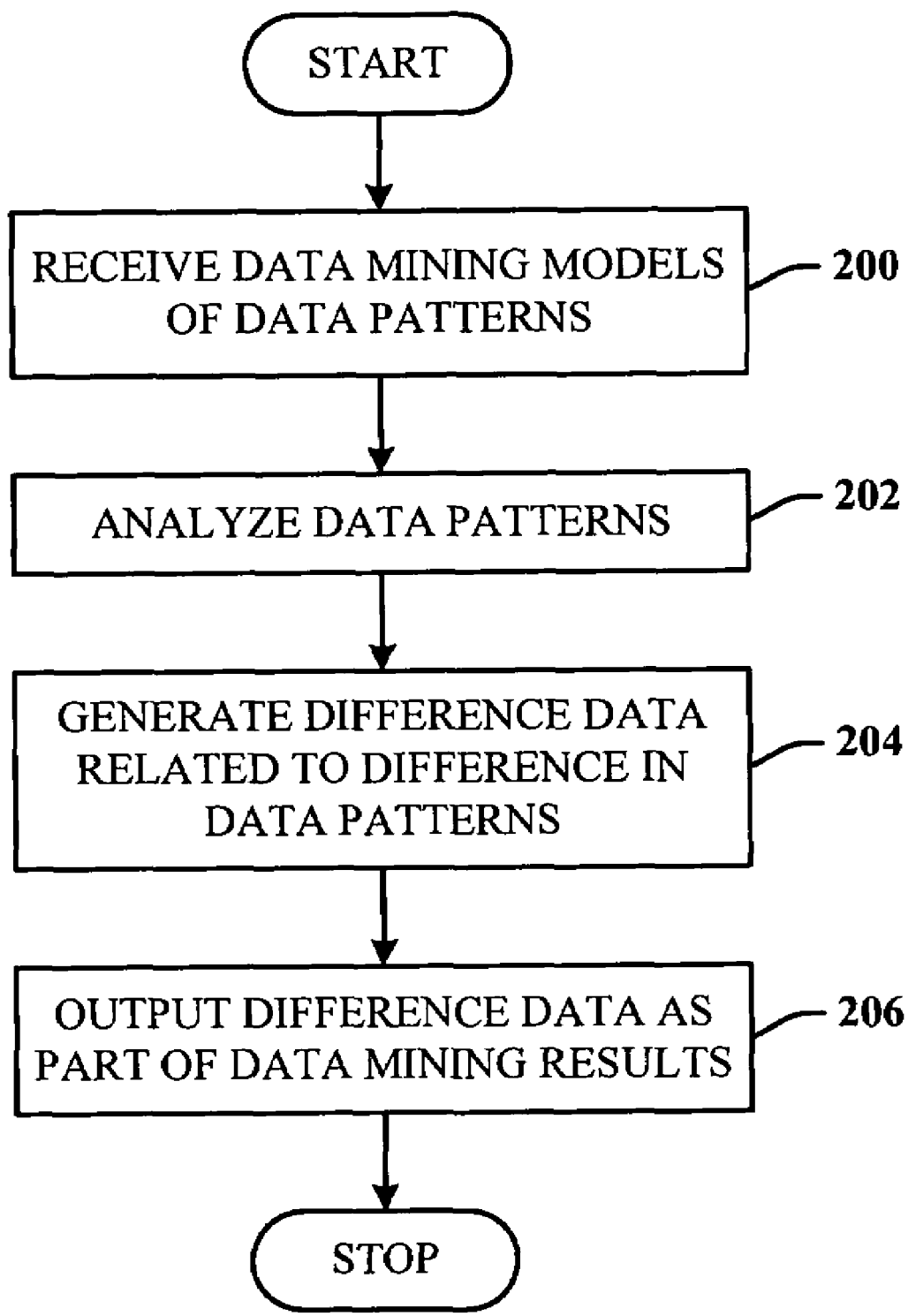
FIG. 2 illustrates a methodology of processing differences in data patterns in accordance with an innovative aspect.

FIG. 2 illustrates a methodology of processing differences in data patterns in accordance with an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, trained data mining model is received having stored therein one or more data patterns in the form of rules generated based on a dataset. At 202, the data patterns are analyzed for difference data. At 204, the difference data associated with the data patterns is generated. At 206, the difference data is output in the form of one or more rules that can be employed in a new or updated data mining model.

Figure 3:
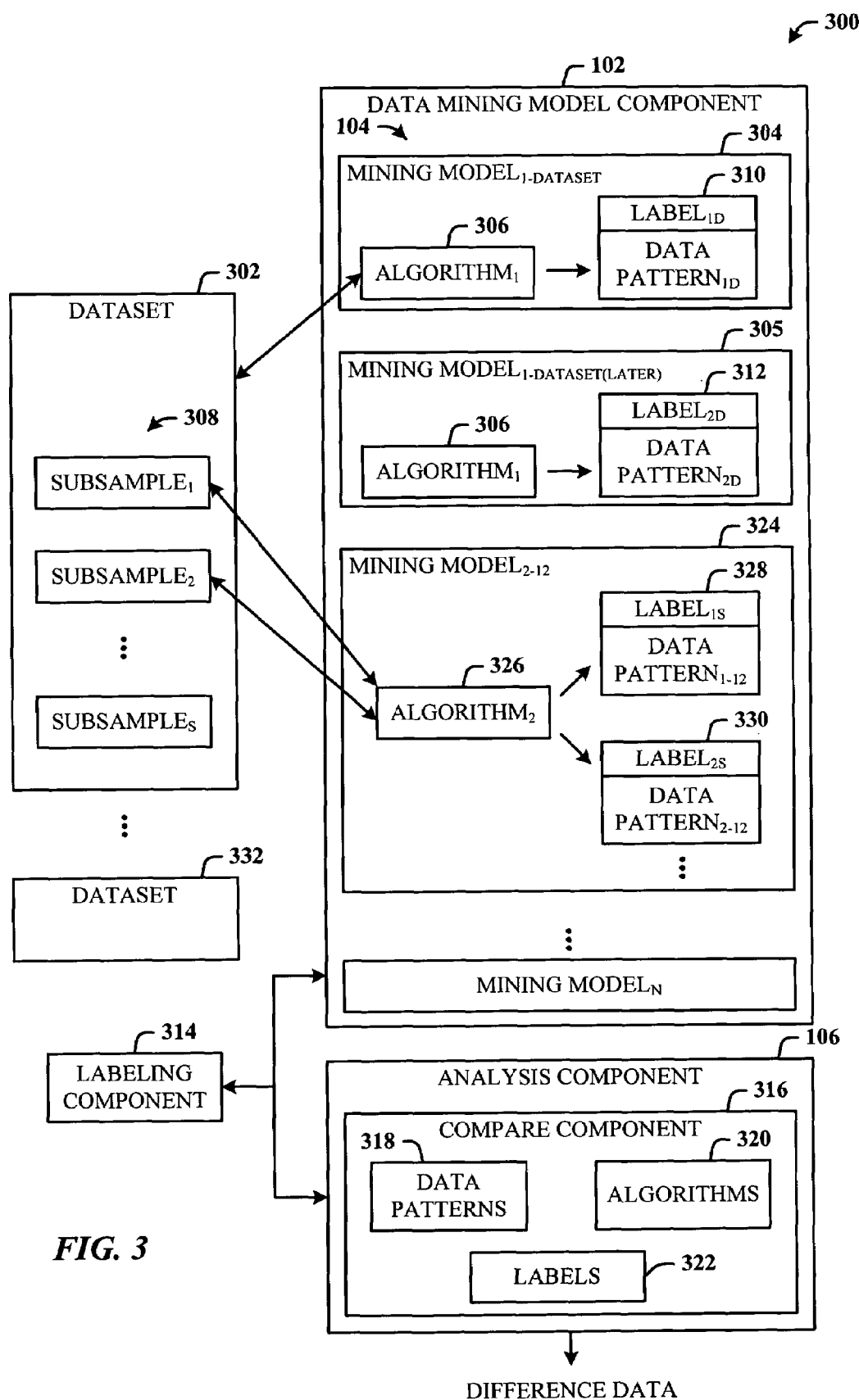
FIG. 3 illustrates a more detailed system for analyzing and processing mining pattern evolution in accordance with an aspect.

FIG. 3 illustrates a more detailed system 300 for analyzing and processing mining pattern evolution in accordance with an aspect. The system 300 can include the data mining model component 102 having one or more data mining models 104 (denoted MINING MODEL$_1$, MINING MODEL$_2$, . . . ,MINING MODEL$_N$), and the analysis component 106 for analyzing changing data patterns of a dataset 302. For example, a first data mining model 304 can utilize an algorithm 306 (denoted ALGORITHM$_1$) (e.g., a predictive algorithm) to analyze the dataset 302 or subsamples 308 thereof (denoted SUBSAMPLE$_1$,SUBSAMPLE$_2$, . . . ,SUBSAMPLE$_S$, where S is an integer).

Assume, first, that the mining model 304 analyzes the dataset 302, as a whole, on two different occasions. Accordingly, the mining model 304, denoted MINING MODEL$_{1\text{-}DATASET}$, can determine at least two different data patterns over time: a first data pattern 310 (denoted DATA PATTERN$_{1D}$) and at a later time, a second data pattern 312 (denoted DATA PATTERN$_{2D}$). The second or later data pattern 312 is associated with the mining model running the algorithm 306 at the later time as a later mining model 305 (denoted MINING MODEL$_{1\text{-}DATASET(LATER)}$). The algorithm 306 allows assigning a class label to the data patterns (310 and 312), such capabilities associated with, for example, classification algorithms and clustering algorithms. Accordingly, a labeling component 314 is provided for assigning a first label (LABEL$_{1D}$) to the first pattern 310 and a second label (LABEL$_{2D}$) to the second pattern 312.

The analysis component 106 can further include a compare component 316 that can compare a number of different entities. For example, the compare component 316 can compare data patterns 318, algorithms 320, and labels 322. Thus, in one implementation, the first and second data patterns (310 and 312) are compared to obtain difference data. The difference data can then be provided in the form of rules that are then utilized as part of the updated (or later) mining model 305 to account for the changes in the dataset over the time period processed.

It is possible for the system to also analyze and process data subsets of the dataset 302. Here, a second mining model 324 processes two subsamples (denoted SUBSAMPLE$_1$ and SUBSAMPLE$_2$) of the dataset 302 with a second algorithm 326 (ALGORITHM$_2$). The results obtained are two corresponding data patterns (DATA PATTERN$_{1\text{-}12}$ and DATA PATTERN$_{2\text{-}12}$): a third data pattern 328 and a fourth data pattern 330, each with respective subsample labels (LABEL$_{1S}$ and LABEL$_{2S}$) assigned thereto by the labeling component 314. The compare component 316 of the analysis component 106 can then compare the third and fourth data patterns (328 and 330) for difference data, which difference data can then be defined as rules for later use.

As indicated supra, the comparison can also be made between algorithms and between labels. For example, a comparison of the first algorithm 306 and the second algorithm 326 can be made, as well as between labels of the first and second data patterns (310 and 312) and the third and fourth data patterns (328 and 330). Cross comparison can be made between the first and third data patterns (310 and 328) as well as the corresponding labels.

As a brief, but not all-inclusive, summary, the system 300 can process differences between data patterns of the same dataset (or population), between data subsets of the same dataset, between semantically similar sets of patterns, between patterns founds by two or more different algorithm applied to the same dataset, between labels, and historical changes in versions of data mining models.

In another implementation, it is within contemplation of the subject innovation that pattern change analysis architecture can be applied to at least two different data populations (e.g., dataset 302 and dataset 332) at the same moment in time. This can be by two data mining models having different, but similar, mining algorithms, for example. In another example, this can be by two mining models, one being an updated version of the other.

Figure 4:
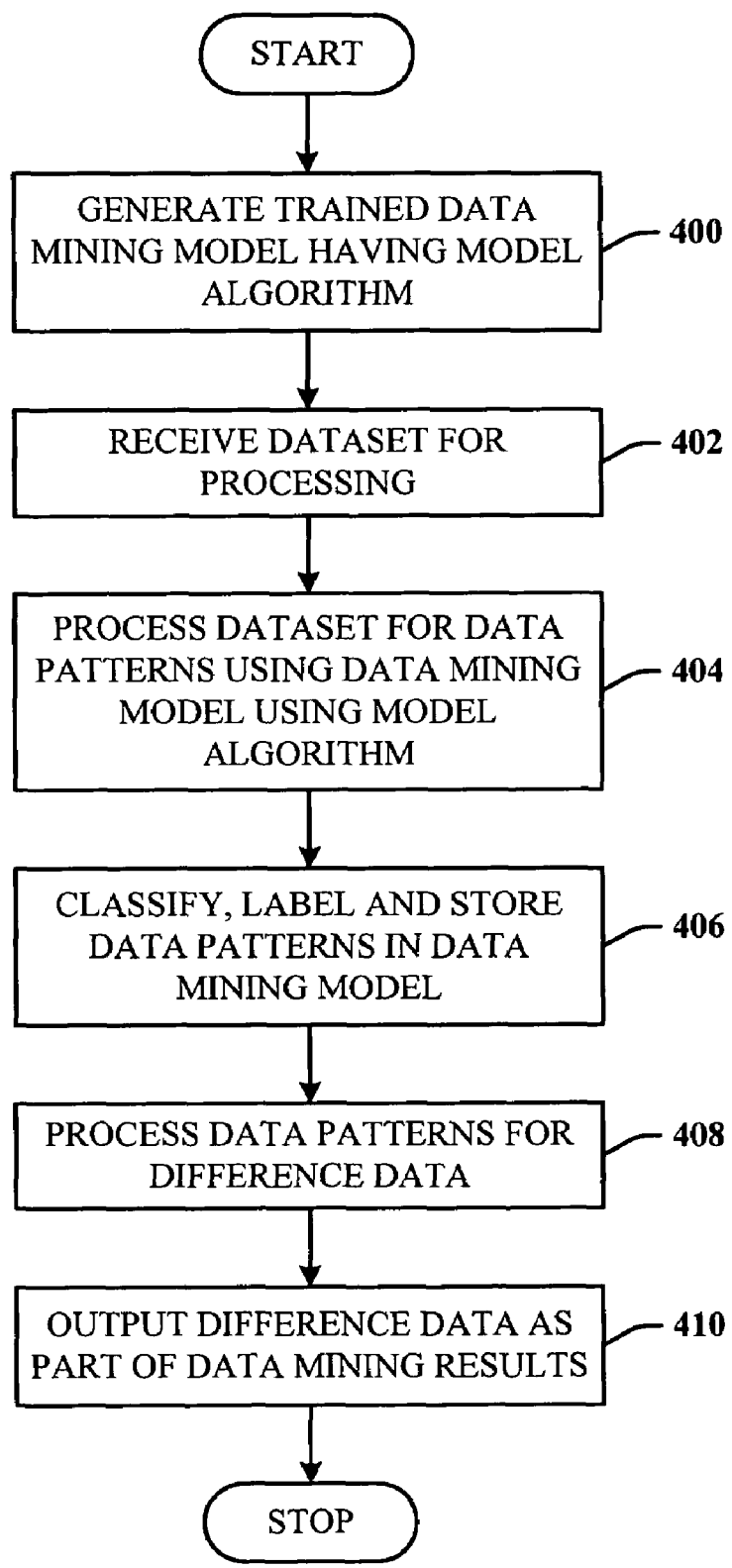
FIG. 4 illustrates a methodology of processing labels in accordance with another aspect of the innovation.

FIG. 4 illustrates a methodology of processing labels in accordance with another aspect of the innovation. At 400, a trained data mining model is generated having a model algorithm. At 402, a dataset is received for processing. At 404, the dataset is processed for data patterns using the algorithm of the data mining model. At 406, the computed data patterns are classified, labeled and stored in the data mining model. At 408, the data patterns are processed for difference data. At 410, the difference data is output as one or more rules that capture the differences for processing with other mining rules to account for the changes in the dataset.

Figure 5:
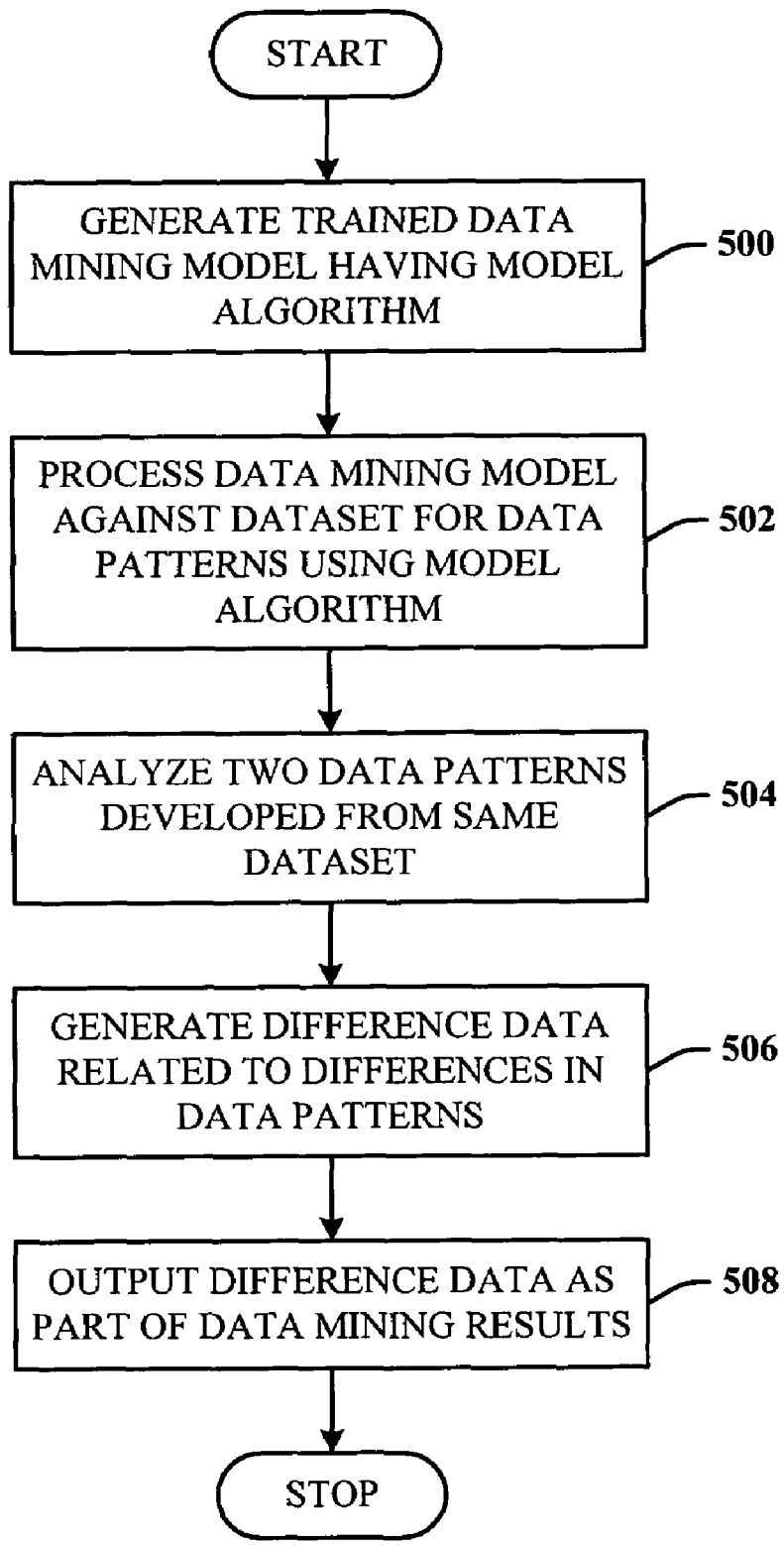
FIG. 5 illustrates a methodology of processing data patterns from the same dataset in accordance with an aspect.

FIG. 5 illustrates a methodology of processing data patterns from the same dataset in accordance with an aspect. At 500, a trained data mining model is generated having a model algorithm. At 502, the model is processed against the dataset for data patterns using the algorithm of the data mining model. At 504, at least two data patterns are developed from the same dataset. At 506, difference data is then generated related to differences in the patterns. At 508, the difference data is output as one or more rules that capture and account for the pattern differences for later processing.

Figure 6:
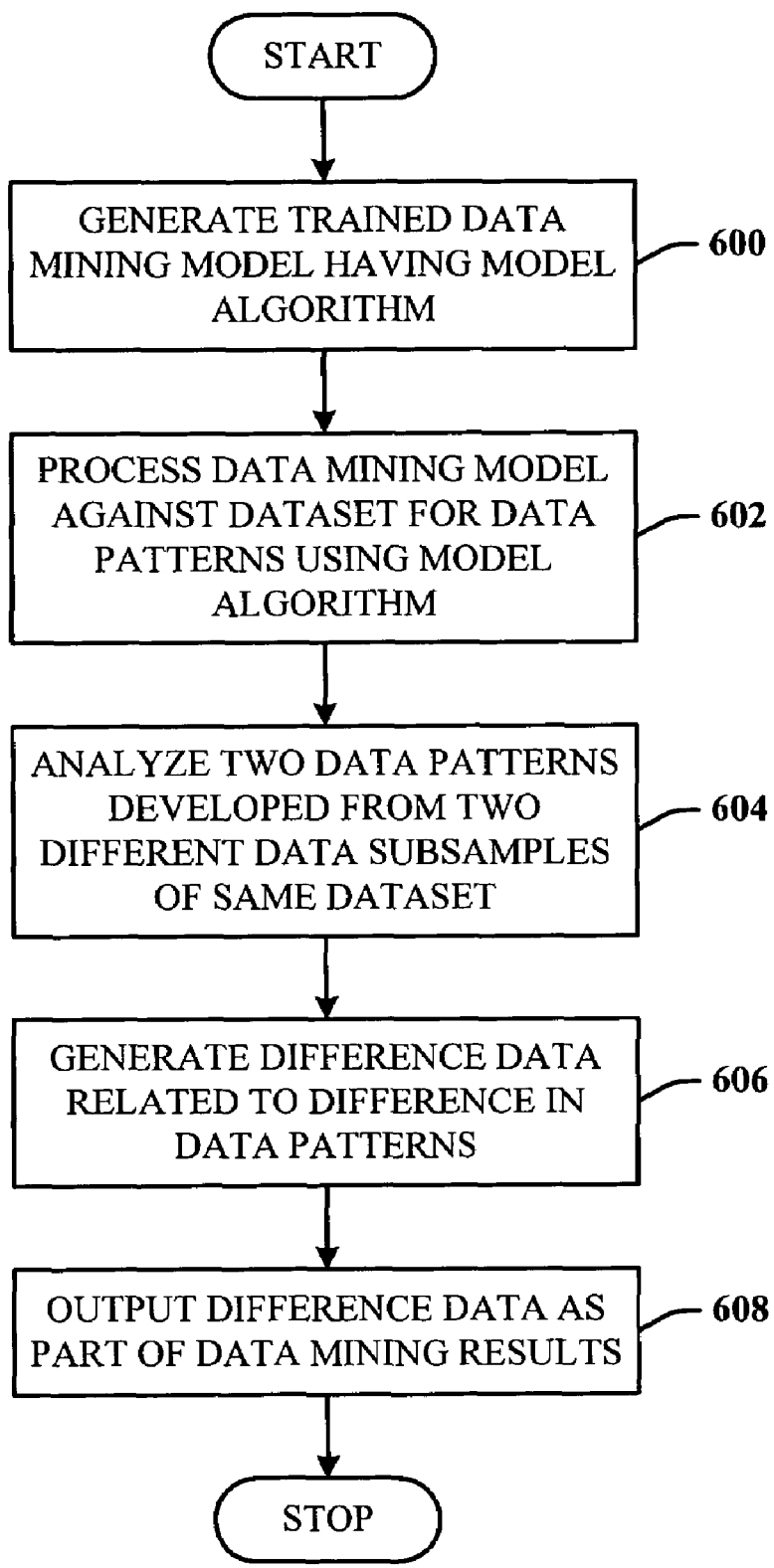
FIG. 6 illustrates a methodology of processing data patterns developed from the same subsamples of the dataset in accordance with the disclosed innovation.

Referring now to FIG. 6, there is illustrated a methodology of processing data patterns developed from the same subsamples of the dataset in accordance with the disclosed innovation. At 600, a trained data mining model is generated having a model algorithm. At 602, the model is processed against the dataset for data patterns using the model algorithm. At 604, at least two data patterns are developed from corresponding subsamples of the same dataset. At 606, difference data is then generated related to differences in the patterns. At 608, the difference data is output as one or more rules for later processing that capture and account for the pattern differences.

Figure 7:
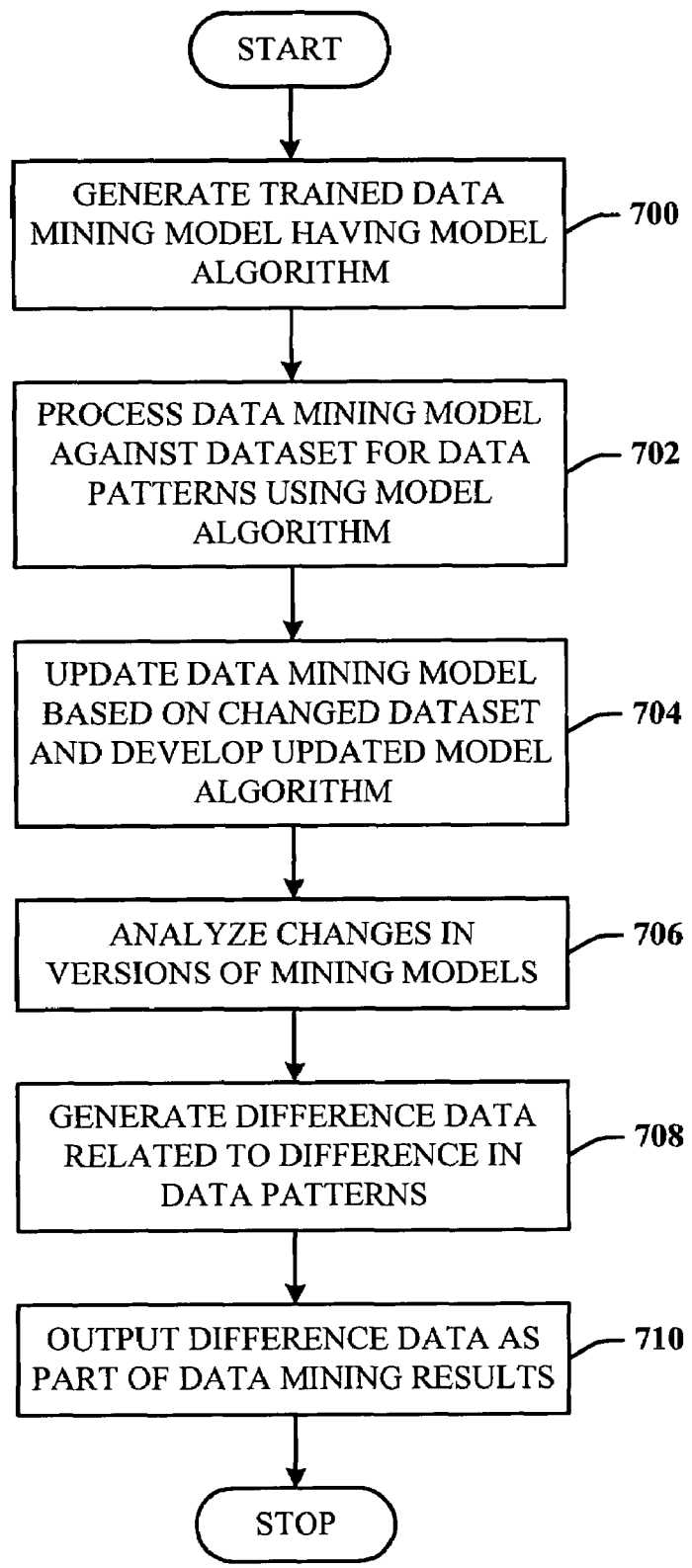
FIG. 7 illustrates a methodology of processing model versions derived from a changing dataset in accordance with an innovation aspect.

FIG. 7 illustrates a methodology of processing model versions derived from a changing dataset in accordance with an innovation aspect. At 700, a trained data mining model is generated having a model algorithm. At 702, the model is processed against the dataset for data patterns using the model algorithm. At 704, the mining model is updated (or a new mining model that reflects the update is generated) that reflects the changes in the dataset. At 706, now that two mining model exist, both are compared and difference data is then generated related to differences in the mining models, as indicated at 708. At 710, the difference data is output as one or more rules for later processing that capture and account for the model differences.

Figure 8:
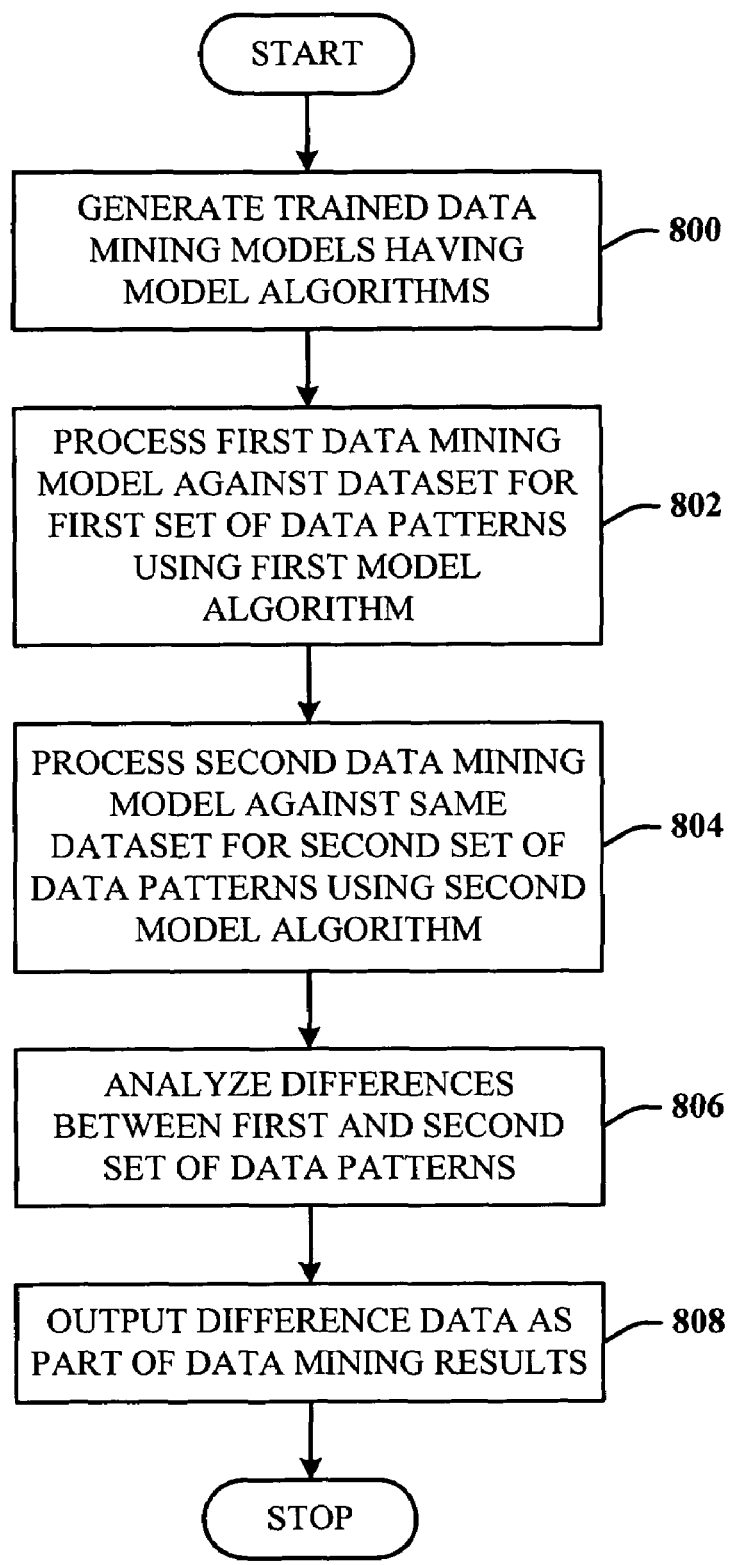
FIG. 8 illustrates a methodology of processing data patterns from two data mining models dataset in accordance with an innovation aspect.

FIG. 8 illustrates a methodology of processing data patterns from two data mining models dataset in accordance with an innovation aspect. At 800, trained data mining models are generated having model algorithms. At 802, a first mining model is processed against the dataset for a first set of data patterns using a first algorithm. At 804, a second mining model is processed against the same dataset for a second set of data patterns using a second algorithm. At 806, both the first and second sets of data patterns are compared and difference data is then generated related to the differences thereof. At 808, the difference data is output as one or more rules for later processing that capture and account for the model differences.

Figure 9:
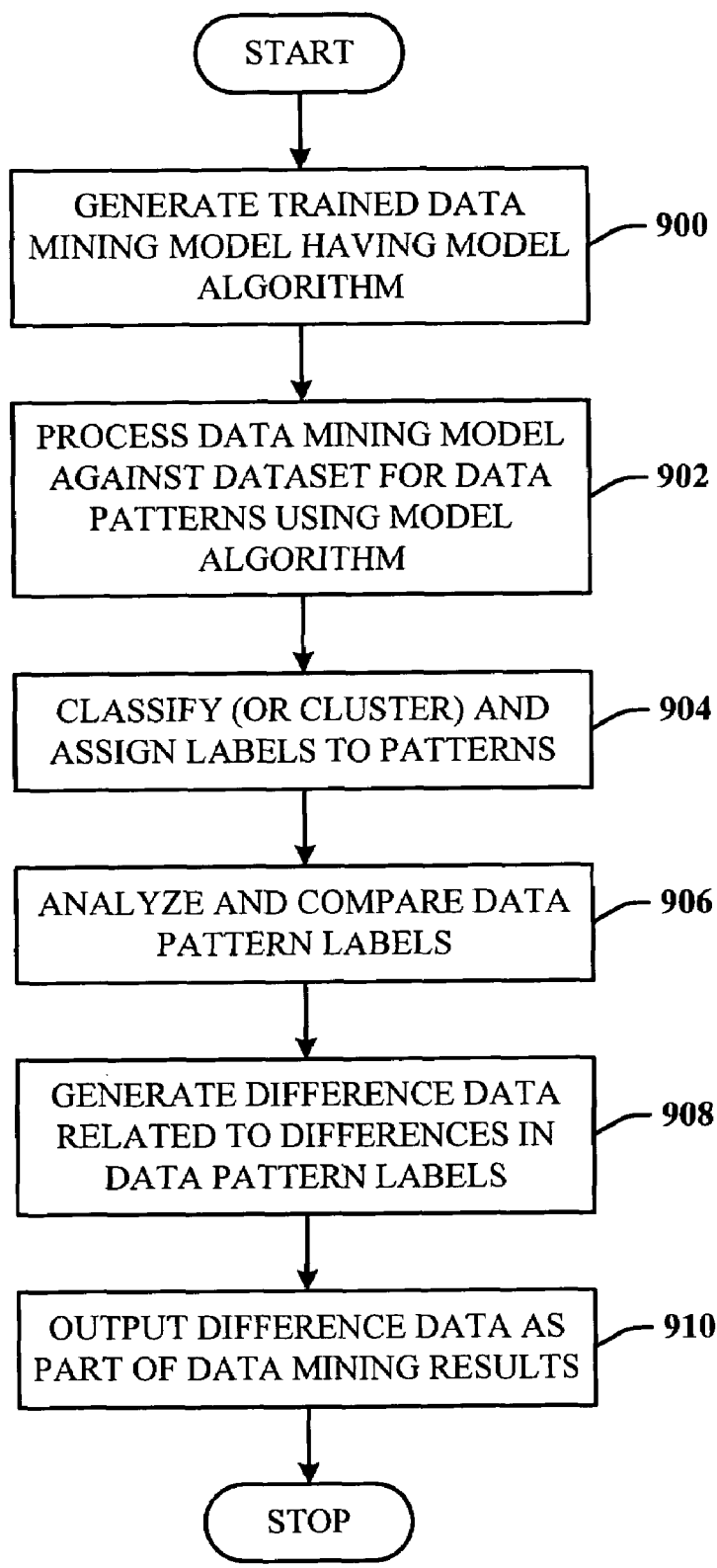
FIG. 9 illustrates a methodology of processing data pattern labels for difference data in accordance with an aspect.

Referring now to FIG. 9, there is illustrated a methodology of processing data pattern labels for difference data in accordance with an aspect. At 900, a trained data mining model is generated having a model algorithm. At 902, the model is processed against the dataset for data patterns using the model algorithm. At 904, the data patterns are classified using a classification algorithm (or clustered using a clustering algorithm), and labels are assigned. At 906, the labels are analyzed and compared for difference data. At 908, the difference data is generated related differences in the data patterns labels. At 910, the difference data is output as one or more rules for later processing that capture and account for the model differences.

Figure 10:
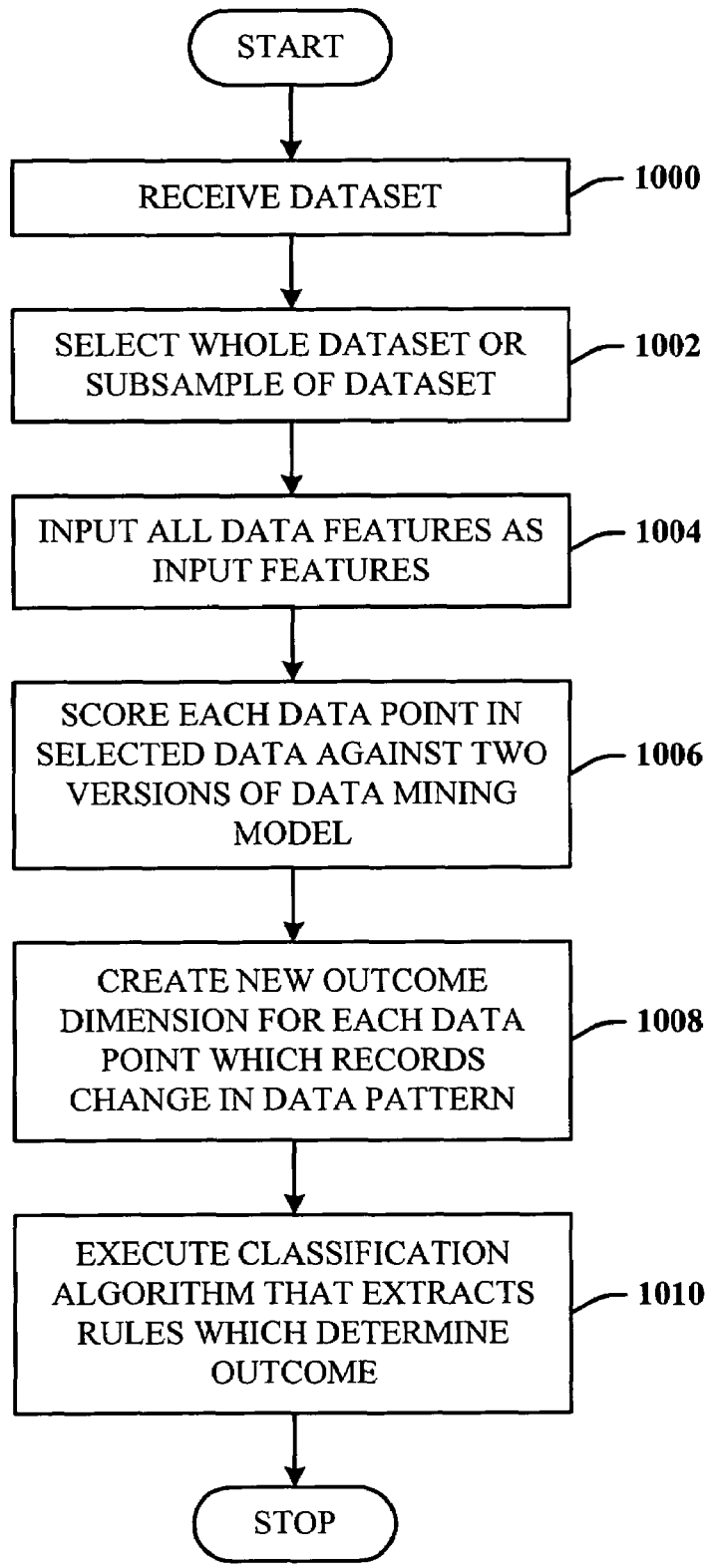
FIG. 10 illustrates a methodology of describing change sin data pattern labels in accordance with an innovation aspect.

FIG. 10 illustrates a methodology of describing change sin data pattern labels in accordance with an innovation aspect. At 1000, a data set is received for processing. At 1002, the whole dataset (or subsamples thereof) are selected for processing. At 1004, all data features are input as input features. At 1006, a point is scored for each data point in the selected data (the dataset or subsamples) and against the two versions of the data mining model. At 1008, a new feature (or dimension) called Outcome, for example, is created for each data point which records a change in the data pattern, if any. This feature will typically have values such as "No change" or "Changed from Label$_1$ to Label$_2$". At 1010, a classification algorithm (e.g., Naïve Bayes or decision trees) is executed that extracts rules which determine or define Outcome.

Figure 11:
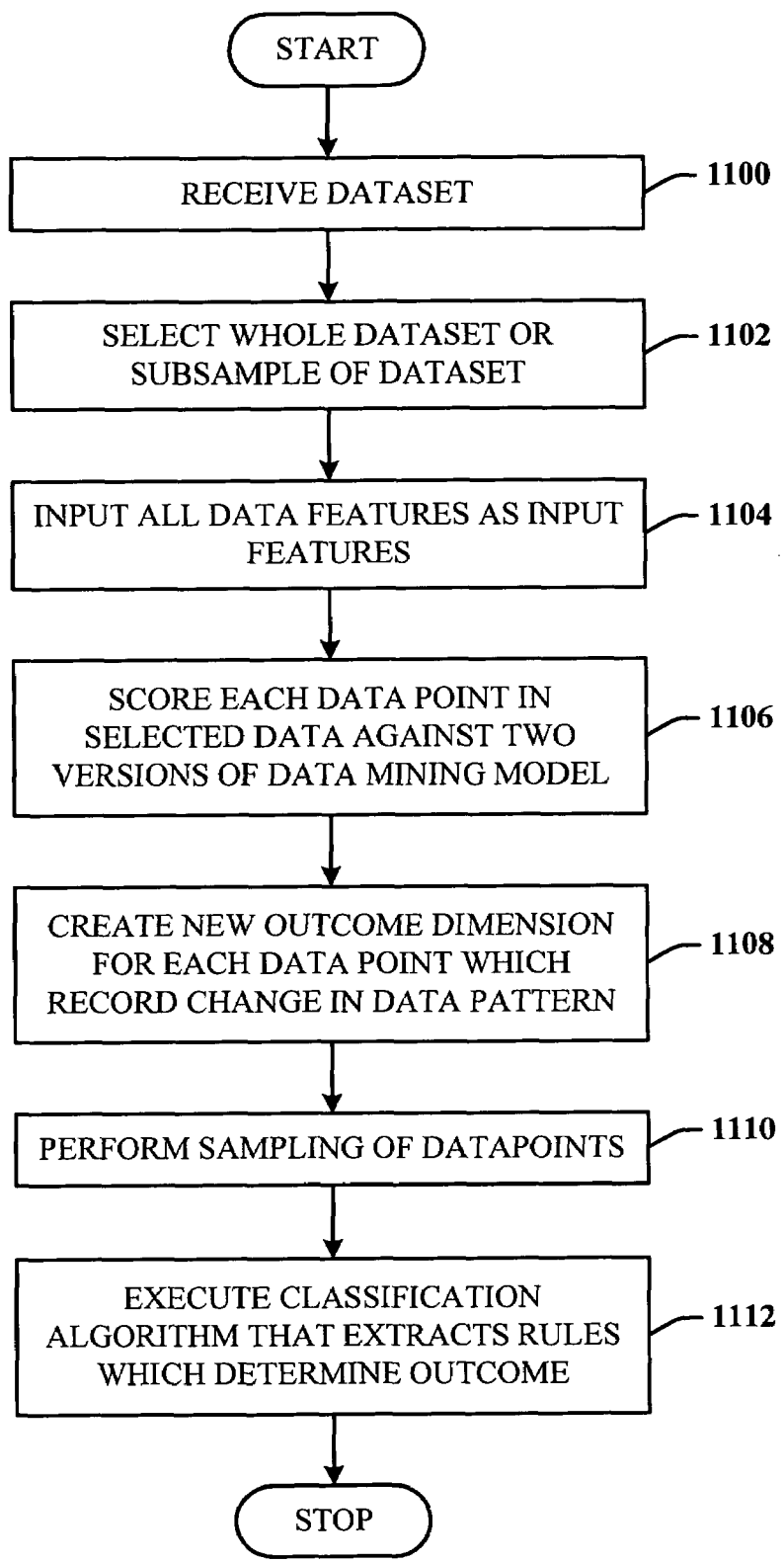
FIG. 11 illustrates a methodology of describing change sin data pattern labels in accordance with an innovation aspect.

FIG. 11 illustrates a methodology of describing change sin data pattern labels in accordance with an innovation aspect. At 1100, a data set is received for processing. At 1102, the whole dataset (or subsamples thereof) are selected for processing. At 1104, all data features are input as input features. At 1106, a point is scored for each data point in the selected data (the dataset or subsamples) and against the two versions of the data mining model. At 1108, a new outcome dimension is created for each data point which records a change in the data pattern. At 1110, sampling can be performed. In one example implementation, stratified sampling can be used when the number of changes is very small. Stratified sampling is an act of dividing a larger population into relatively homogeneous subgroups (or stratum), using systematic sampling, and then taking a random sample from each subgroup. Random sampling can frequently minimize the sampling error in the population. This in turn increases the precision of any estimation methods used. In an alternative methodology, when the number of observations characterizing the changes are very small, all are used. In other words, if further sampling is not performed carefully, it can reduce the ability of the mining algorithm to discover meaningful relationships. At 1112, a classification algorithm is executed that extracts rules which determine or define the outcome.

Figure 12:
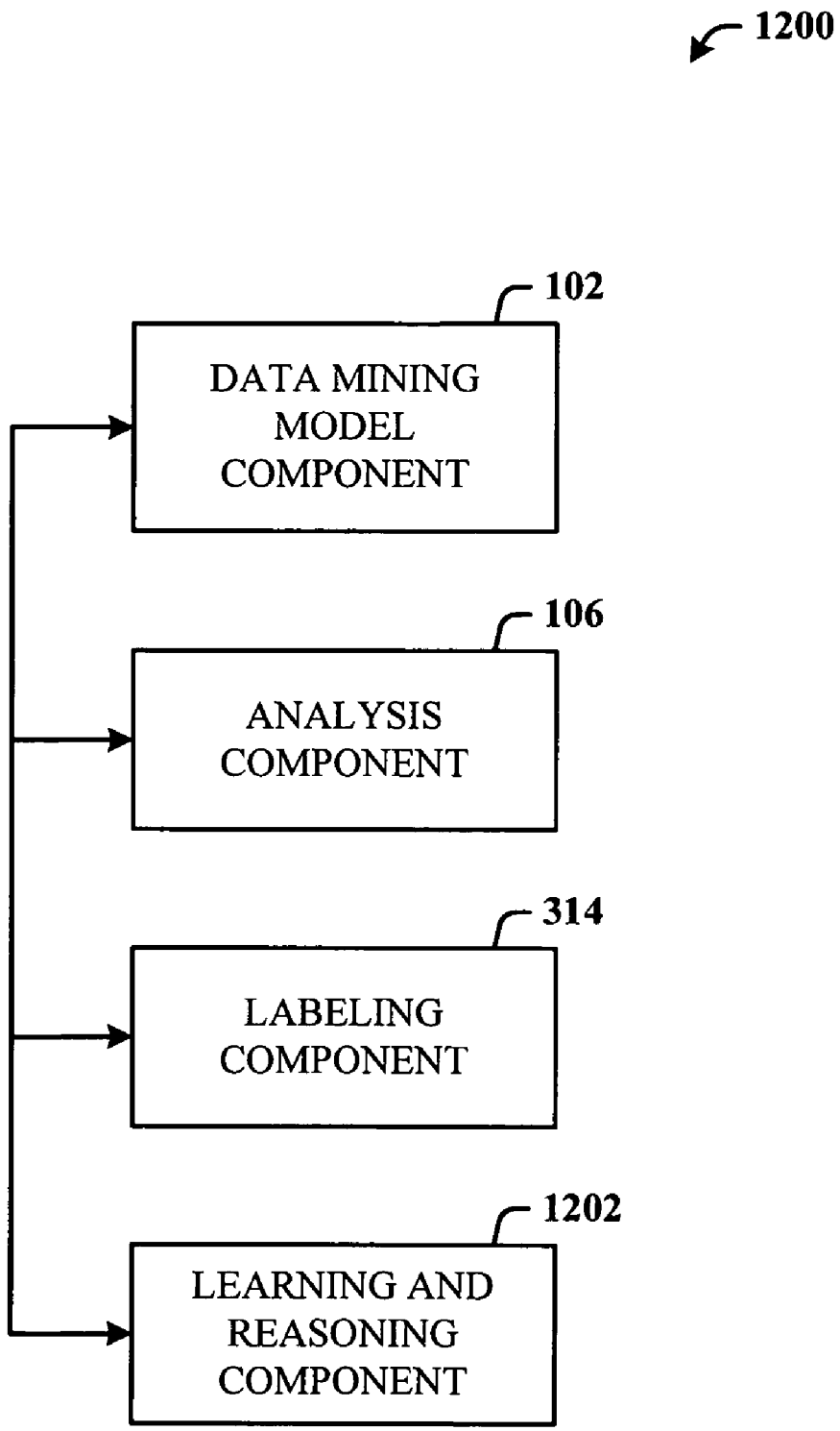
FIG. 12 illustrates a system that employs a machine learning and reasoning component which facilitates automating one or more features in accordance with the subject innovation.

FIG. 12 illustrates a system 1200 that employs a machine learning and reasoning (LR) component 1202 which facilitates automating one or more features in accordance with the subject innovation. The subject invention (e.g., in connection with selection) can employ various LR-based schemes for carrying out various aspects thereof. For example, a process for determining how to classify a data pattern can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis (e.g., one factoring into the analysis utilities and costs to maximize the expected value to one or more people) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one implementation, the LR component 1202 can facilitate selection of the methodology for determining the difference data. For example, the LR component 1202 can determine if it is more advantageous to select algorithm comparison, label comparison, data pattern comparison, and so on. Moreover, the LR component 1202 can be employed to form the rules derived from the computed difference data. These are just a few examples of the many uses for the LR component 1202.

Figure 13:
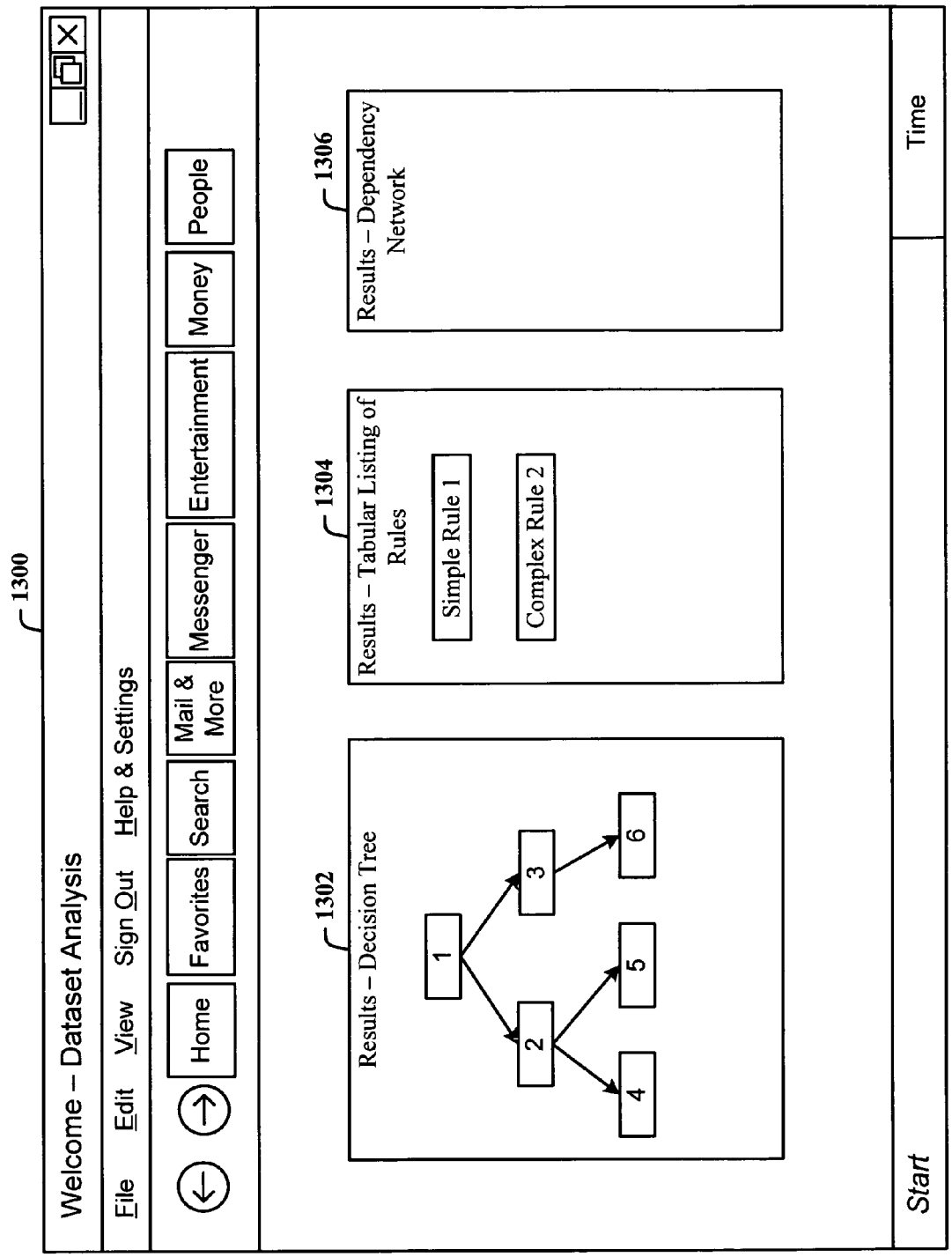
FIG. 13 illustrates a screenshot of methods for presenting results of a classification algorithm in accordance with an aspect.

FIG. 13 illustrates a screenshot 1300 of methods for presenting results of a classification algorithm in accordance with an aspect. Results of the classification algorithm can be presented by a webpage, for example, and in the form of a decision tree 1302, a tabular listing 1304 of rules, and/or a dependency network 1306.

Figure 14:
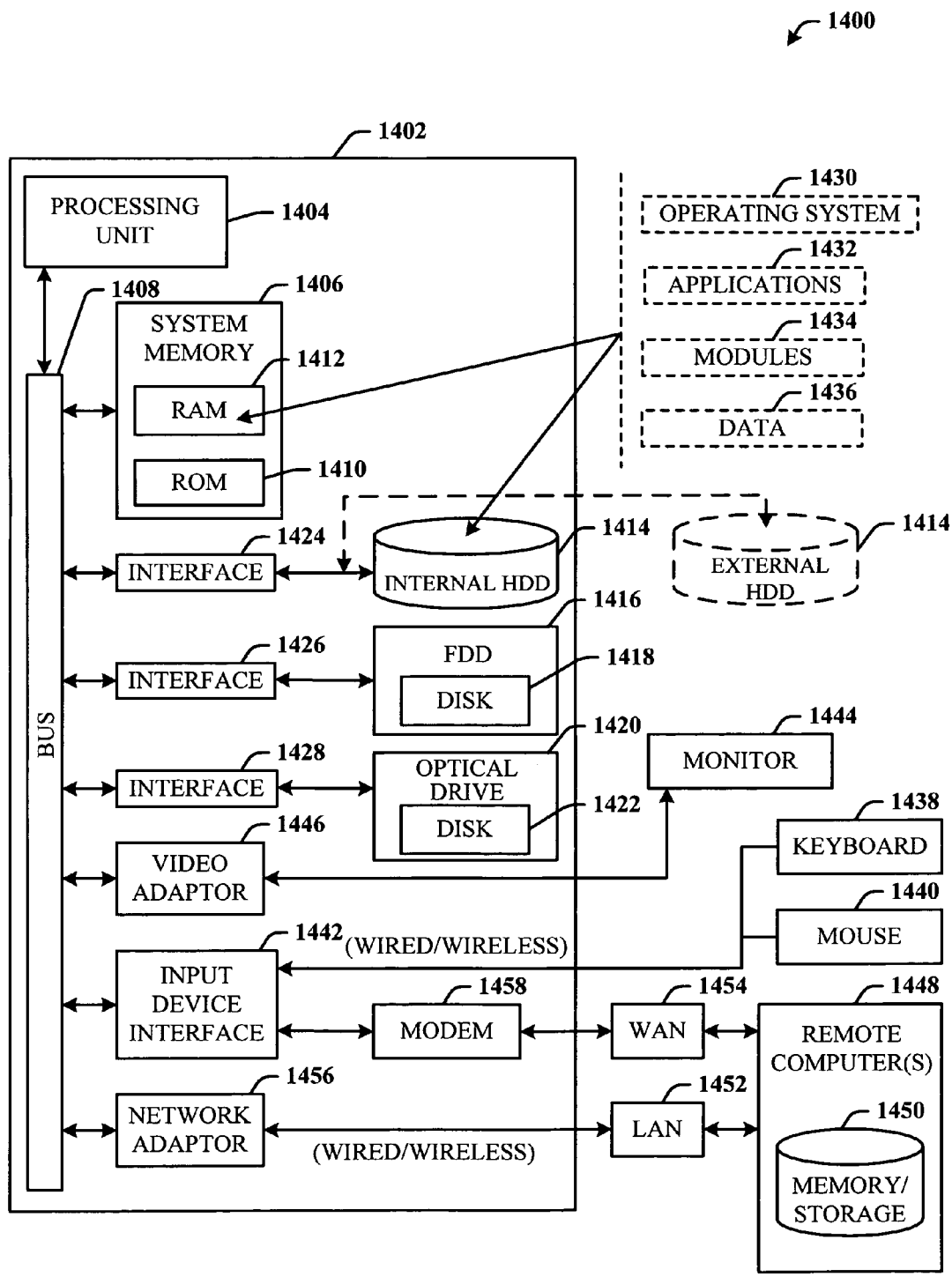
FIG. 14 illustrates a block diagram of a computer operable to execute the disclosed mining pattern evolution analysis architecture.

Referring now to FIG. 14, there is illustrated a block diagram of a computer operable to execute the disclosed mining pattern evolution analysis architecture. In order to provide additional context for various aspects thereof, FIG. 14 and the following discussion are intended to provide a brief, general description of a suitable computing environment 1400 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary environment 1400 for implementing various aspects includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adaptor 1456 may facilitate wired or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11 g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 15:
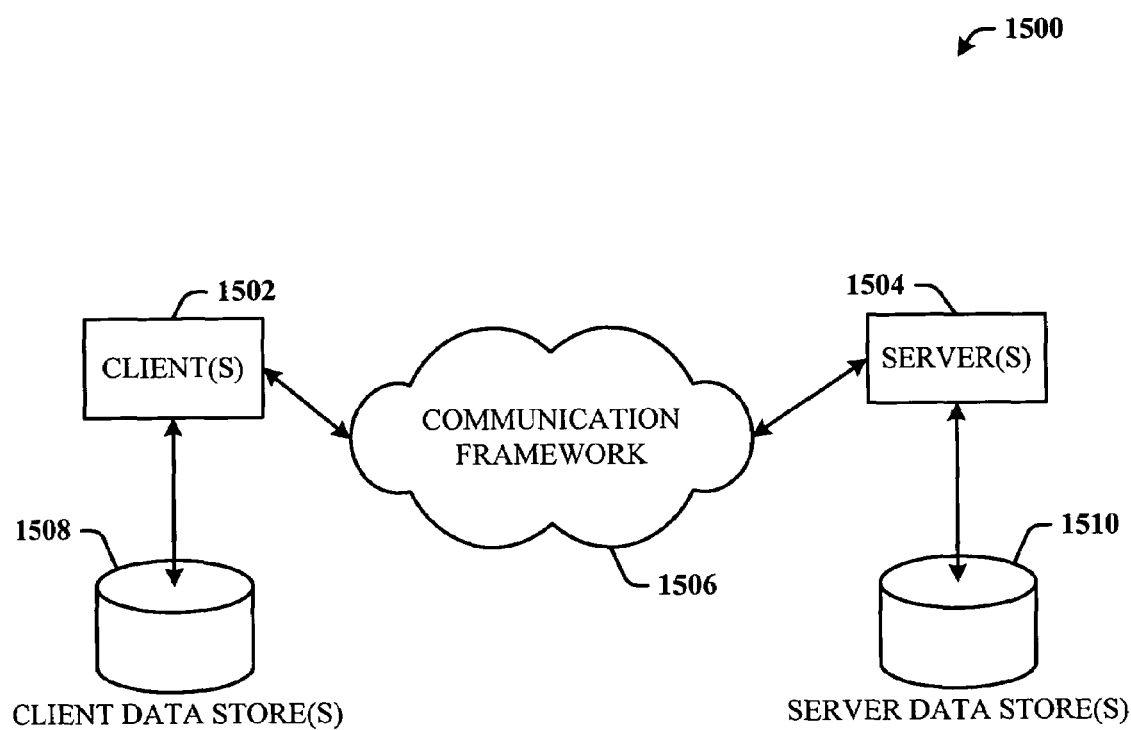
FIG. 15 illustrates a schematic block diagram of an exemplary computing environment for analyzing mining pattern evolution in accordance with another aspect.

Referring now to FIG. 15, there is illustrated a schematic block diagram of an exemplary computing environment 1500 for analyzing mining pattern evolution in accordance with another aspect. The system 1500 includes one or more client(s) 1502. The client(s) 1502 can be hardware and/or software (e.g., threads, processes, computing devices). The client(s) 1502 can house cookie(s) and/or associated contextual information by employing the subject innovation, for example.

The system 1500 also includes one or more server(s) 1504. The server(s) 1504 can also be hardware and/or software (e.g., threads, processes, computing devices). The servers 1504 can house threads to perform transformations by employing the invention, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wired (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system for analyzing mining pattern evolution, comprising: a model component for storing two or more data mining models that are employed to generate multiple data patterns obtained from a dataset, the multiple patterns obtained by employing values in the dataset at different instances of time;

A machine learning and reasoning component that employs a probabilistic or statistical-based analysis to determine if it is more advantageous to select label comparison, data pattern comparison, or algorithm comparison to detect difference data;

an analysis component for analyzing the multiple data patterns for difference data there between to detect changes in the multiple data patterns based in part on a change in one or more labels associated with each of the multiple data patterns, a comparison of the multiple data patterns, or a comparison of two or more algorithms associated with the two or more data mining models; and a component to generate at least one rule based on the analysis that is employed to modify the data mining model, the at least one rule captures the analyzed differences to account for a change in the dataset.

2. The system of claim 1, wherein the model component further stores a different version of the data mining model that is used to generate a data pattern for comparison with the multiple data patterns, the different version using a different algorithm.

3. The system of claim 1, wherein the dataset is a subsample of a larger set of data.

4. The system of claim 1, wherein the difference data is analyzed by the analysis component over a time period.

5. The system of claim 1, further comprising a compare component that compares the data patterns.

6. The system of claim 1, further comprising an interface component for presenting the difference data as one of a decision tree, a dependency network, or a tabular listing of one or more rules.

7. The system of claim 1, further comprising a labeling component for uniquely labeling a data pattern.

8. The system of claim 7, wherein the data mining model includes one of a classification algorithm or a clustering algorithm that facilitates labeling of the data pattern.

9. A computer-implemented method of processing data mining information for differences, comprising:
   Receiving a dataset having data that changes over time;
   Generating a data pattern from the dataset by employing two or more data mining algorithms;
   Generating a disparate data pattern associated with the dataset by employing the two or more data mining algorithms, the disparate data pattern is generated by executing the data mining algorithm over the dataset at a different instance of time when one or more values in the dataset change;
   employing a machine learning and reasoning component using probabilistic or statistical-based analysis to determine if its more advantageous to select label comparison, data pattern comparison, or algorithm comparison to detect change information related to a change in the dataset;
   comparing the data patterns, one or more labels associated with the data patterns, or the two or more algorithms to determine change information related to a change in the dataset, the change information identifies or explains a shift in the data patterns;
   creating an outcome dimension for a data point which records a change in the data patterns based in part on the change information;
   generating one or more rules based on the change information that determine when a change in the dataset occurs; and
   outputting the one or more rules that are employed to modify the data mining model to account for the changes in the dataset over the time period processed.

10. The method of claim 9, further comprising an act of outputting the rules to a user via a display.

11. The method of claim 9, further comprising an act of labeling data patterns of the dataset, and comparing the labels to determine the change information.

12. The method of claim 9, further comprising an act of labeling data patterns of the dataset, and comparing the data patterns to determine the change information.

13. The method of claim 9, further comprising an act of converting the change information into one or more rules.

14. The method of claim 9, further comprising an act of processing subsamples of the dataset with the algorithm to generate corresponding sets of data patterns, and comparing the sets of data patterns to obtain the change information.

15. The method of claim 9, further comprising acts of one of: clustering and classifying data patterns of the dataset; labeling the data patterns; storing the labeled data patterns in the data mining model; comparing the data patterns to generate the change information; and updating the data mining model according to the one or more rules.

16. The method of claim 9, further comprising an act of processing all of the dataset with the algorithm at a first time and a second time, and comparing the change in the dataset from the first time to the second time to generate the change information.

17. A computer-executable system for processing data mining information, comprising:
   Computer-implemented means for receiving a dataset having data that changes over time;
   Computer-implemented means for generating two or more data patterns from the dataset, the two or more patterns generated by executing two or more data mining algorithms over the dataset at different instances of time when one or more values in the dataset change;
   Computer-implemented means for labeling data patterns of the dataset with corresponding labels;
   Computer-implemented means for employing a machine learning and reasoning component using probabilistic or statistical-based analysis to determine if its more advantageous to select label comparison, data pattern comparison, or algorithm comparison to detect change information related to a change in the dataset;
   Computer-implemented means for comparing at least one of the labels, the data patterns, or the two or more data mining algorithms to determine change information related to a change in the dataset that facilitates identification or explanation of a shift in the data patterns;
   Computer-implemented means for creating a new outcome dimension for a data point which records a change in the data pattern;
   Computer-implemented means for generating one or more rules that determine the new outcome based in part on employing a classification algorithm; and
   Computer-implemented means for employing the one or more rules to modify the data mining model to account for the change in the dataset over the time period processed, the one or more rules presented to a user.

* * * * *